United States Patent
Guo et al.

(10) Patent No.: US 10,677,595 B2
(45) Date of Patent: Jun. 9, 2020

(54) METHOD FOR NAVIGATING AN AUTOMATED GUIDED VEHICLE

(71) Applicants: INVENTEC APPLIANCES (PUDONG) CORPORATION, Shanghai (CN); INVENTEC APPLIANCES CORP., New Taipei (TW); INVENTEC APPLIANCES (NANCHANG) CORPORATION, Jiangxi (CN)

(72) Inventors: Hou-Jin Guo, Shanghai (CN); Zhi-Peng Ye, Shanghai (CN)

(73) Assignees: INVENTEC APPLIANCES (PUDONG) CORPORATION, Shanghai (CN); INVENTEC APPLIANCES CORP., New Taipei (TW); INVENTEC APPLIANCES (NANCHANG) CORPORATION, Jiangxi (CN)

( * ) Notice: Subject to any disclaimer, the term of this patent is extended or adjusted under 35 U.S.C. 154(b) by 347 days.

(21) Appl. No.: 15/624,805

(22) Filed: Jun. 16, 2017

(65) Prior Publication Data
US 2018/0149482 A1    May 31, 2018

(30) Foreign Application Priority Data
Nov. 30, 2016   (CN) ................... 2016 1 1089135

(51) Int. Cl.
G01C 21/20    (2006.01)

(52) U.S. Cl.
CPC .................. G01C 21/206 (2013.01)

(58) Field of Classification Search
CPC ..................................... G01C 21/206
See application file for complete search history.

(56) References Cited

U.S. PATENT DOCUMENTS

| | | | | |
|---|---|---|---|---|
| 5,483,355 A | * | 1/1996 | Overton | G06T 5/20 358/447 |
| 5,748,109 A | * | 5/1998 | Kosaka | G01C 21/3635 340/995.14 |
| 6,321,158 B1 | * | 11/2001 | DeLorme | G01C 21/26 340/995.16 |
| 7,386,163 B2 | * | 6/2008 | Sabe | G06K 9/00664 348/118 |

(Continued)

Primary Examiner — Jelani A Smith
Assistant Examiner — Majdi Alsomiri
(74) Attorney, Agent, or Firm — McClure, Qualey & Rodack, LLP

(57) ABSTRACT

A method for navigating an automated guided vehicle is provided. The method includes: generating an environment map for an automated guided vehicle and setting a target position, wherein the environment map at least includes an open region and a barrier region; generating a first navigation path on the environment map according to the target position; optimizing the first navigation path by using a dichotomy method to generate a second navigation path; orthogonalizing the second navigation path to generate a third navigation path, wherein every two adjacent line segments in the third navigation path are orthogonal to each other; and navigating the automated guided vehicle to the target position using the third navigation path. The method for navigating the automated guided vehicle according to the invention optimizes navigation paths.

11 Claims, 6 Drawing Sheets

(56) References Cited

U.S. PATENT DOCUMENTS

| | | | | |
|---|---|---|---|---|
| 7,660,441 | B2* | 2/2010 | Chen | G06K 9/0063 |
| | | | | 382/113 |
| 8,391,647 | B1* | 3/2013 | Gondek | G06T 3/403 |
| | | | | 382/192 |
| 2003/0174247 | A1* | 9/2003 | Lee | H04N 7/012 |
| | | | | 348/446 |
| 2008/0123998 | A1* | 5/2008 | Gomi | G06K 9/4609 |
| | | | | 382/300 |
| 2009/0043504 | A1* | 2/2009 | Bandyopadhyay | G01C 17/38 |
| | | | | 701/469 |
| 2010/0020093 | A1* | 1/2010 | Stroila | G01C 21/20 |
| | | | | 345/589 |
| 2010/0023249 | A1* | 1/2010 | Mays | G01C 21/20 |
| | | | | 701/532 |
| 2010/0023252 | A1* | 1/2010 | Mays | G01C 21/20 |
| | | | | 701/533 |
| 2010/0299065 | A1* | 11/2010 | Mays | G01C 21/20 |
| | | | | 701/533 |
| 2011/0106339 | A1* | 5/2011 | Phillips | G05D 1/0033 |
| | | | | 701/2 |
| 2015/0287230 | A1* | 10/2015 | Cerny | G06T 15/005 |
| | | | | 345/501 |
| 2018/0075608 | A1* | 3/2018 | Ding | G06T 7/136 |

* cited by examiner

| 221 | | | | | |
|---|---|---|---|---|---|
| Start point (42) | 38 | 34 | 30 | 34 | 38 |
| 38 | 28 | 24 | 20 | 24 | 28 |
| 34 | 24 | 14 | 10 | 14 | 24 |
| 30 | 20 | 10 | Target point | 10 | 20 |
| 34 | 24 | 14 | 10 | 14 | 24 |
| 38 | 28 | 24 | 20 | 24 | 28 |

METHOD FOR NAVIGATING AN AUTOMATED GUIDED VEHICLE

This application claims the benefit of People's Republic of China application Serial No. 201611089135.5, filed Nov. 30, 2016, the subject matter of which is incorporated herein by reference.

BACKGROUND OF THE INVENTION

Field of the Invention

The invention relates in general to a field of automatic control, and more particularly to a method for navigating an automated guided vehicle.

Description of the Related Art

AGV, which stands for "Automated guided vehicle", refers to a vehicle equipped with an electromagnetic automatic guiding device or an optical automatic guiding device. The AGV can drive along a planned guiding path and provide safety protection and various transfer functions.

Currently, the path planning of an AGV is mainly based on safety and distance. However, since the environment map obtained using simultaneous localization and mapping (SLAM) technology has serrations, at which the planned path needs to change direction frequently, the AGV also needs to change direction frequently when following the planned path.

Due to technological limitations and the influence of scanning frequency, when a radar scanner used in an AGV scans the surrounding environment, the generated environment map will contain noises and have uneven edges. If path planning and navigation is based on such a crude map, the AGV will not be stable safety concern will arise when the AGV travels on the road.

SUMMARY OF THE INVENTION

To resolve the defects of the prior art, the invention provides a method for navigating an automated guided vehicle, capable of optimizing navigation paths of the automated guided vehicle.

According to one embodiment of the present invention, a method for navigating an automated guided vehicle is provided. The method includes: generating an environment map for the automated guided vehicle and setting a target position, wherein the environment map at least includes an open region and a barrier region; optimizing the first navigation path by using a dichotomy method to generate a first navigation path on the environment map according to the target position; generating a second navigation path; orthogonalizing the second navigation path to generate a third navigation path, wherein every two adjacent line segments in the third navigation path are orthogonal to each other; and navigating the AGV to the target position using the third navigation path. The above and other aspects of the invention will become better understood with regard to the following detailed description of the preferred but non-limiting embodiment(s). The following description is made with reference to the accompanying drawings.

DETAILED DESCRIPTION OF THE INVENTION

Detailed descriptions of exemplary embodiments of the invention are disclosed below with accompanying drawings. However, exemplary embodiments can be implemented in many different ways, and should be understood as being limited to the embodiments disclosed below. On the contrary, the descriptions of the exemplary embodiments are for completely transferring the concepts of the exemplary embodiments to technical personnel of the technology field of the invention. Designations common to the accompanying drawings are used to indicate identical or similar elements, and repetitions in the descriptions of identical or similar elements are omitted.

Accompanying drawings of the invention are merely used to illustrate relative positions of the components, and the sizes of the components illustrated in the accompanying drawings are not based on actual scales. Detailed descriptions of the method for navigating the AGV according to the invention are disclosed below with reference to accompanying drawings.

Figure 1:
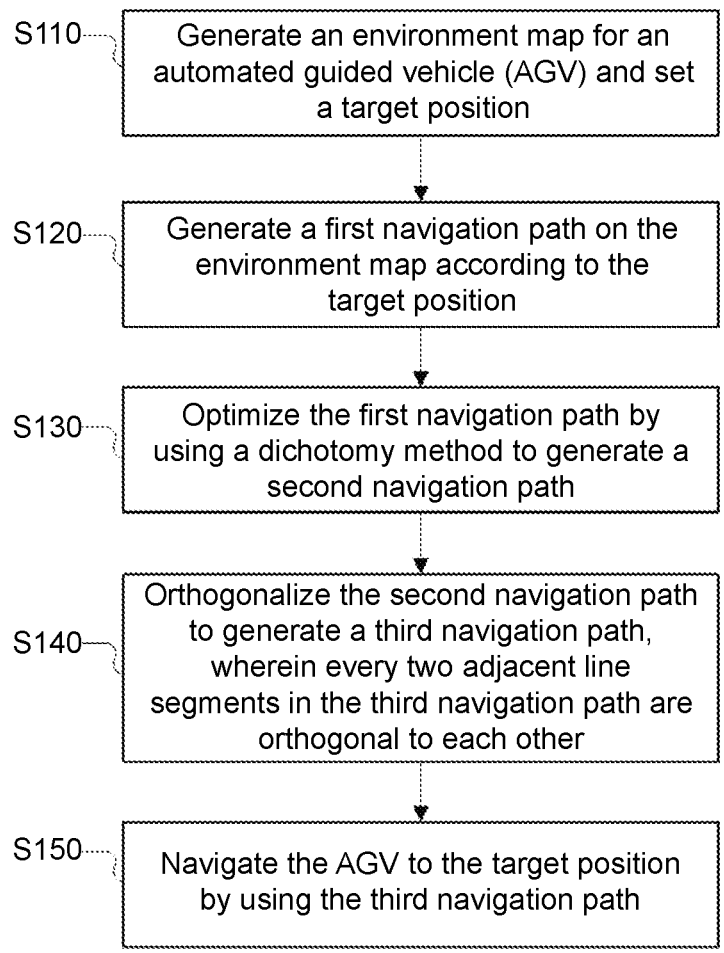
FIG. 1 is a flowchart of a method for navigating an AGV according to an embodiment of the invention.

Referring to FIG. 1, a flowchart of a method for navigating an AGV according to an embodiment of the invention is shown. As illustrated in FIG. 1, the method includes 5 steps. In step S110: an environment map 201 for an automated guided vehicle (AGV) is generated and a target position is set.

Figure 2:
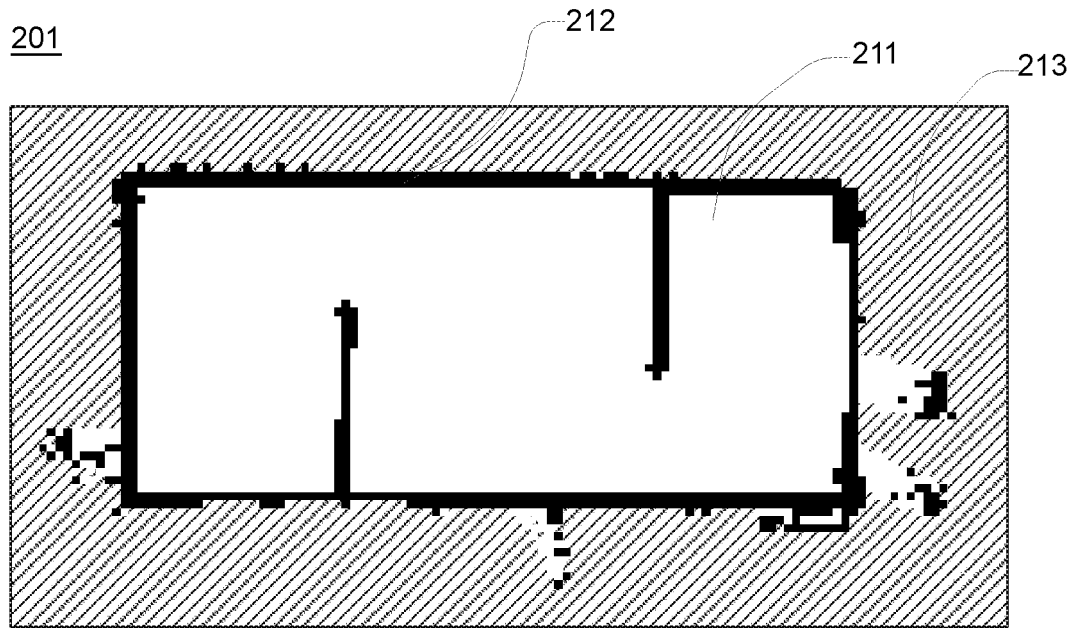
FIG. 2 is a schematic diagram of an environment map according to an embodiment of the invention.

Referring to FIG. 2, a schematic diagram of an environment map according to an embodiment of the invention is shown. The environment map 201 at least includes an open region 211 displayed in white color and a barrier region 212 displayed in black color. The environment map 201 may further include an un-explored region 213 displayed in gray color. Optionally, during travelling, the laser scanner installed in the AGV continuously rotates to explore the surrounding environment, and further performs positioning to generate an environment map 201 according to the scanned data using the SLAM technology.

Figure 3:
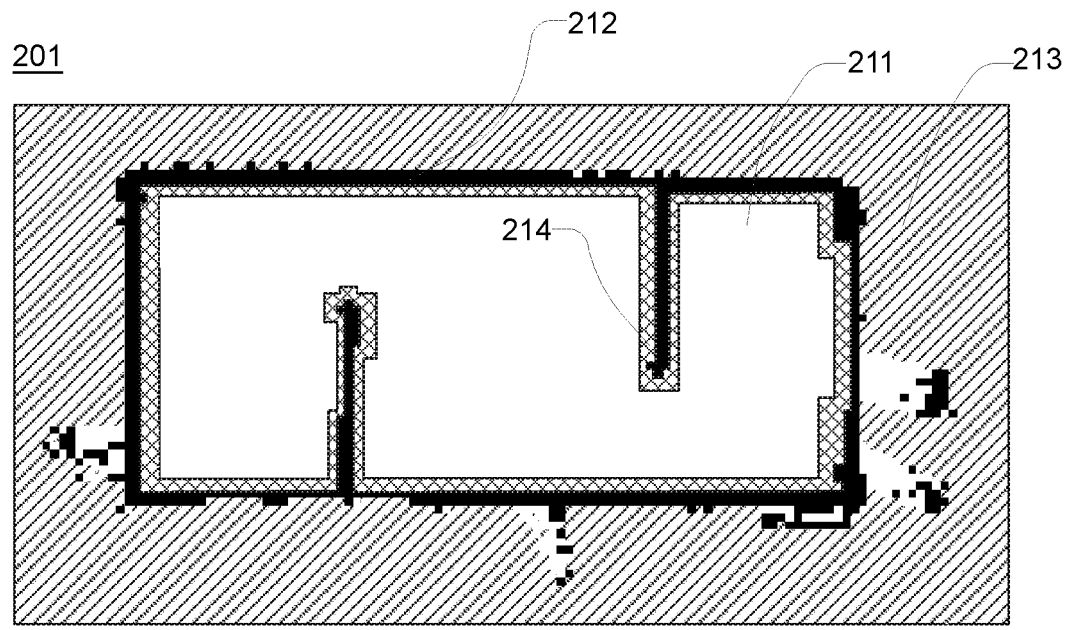
FIG. 3 is a schematic diagram of an environment map having a buffer region according to an embodiment of the invention.

Optionally, in step S110, the environment map 201 is optimized. Referring to FIG. 3, a schematic diagram of an environment map having a buffer region according to an embodiment of the invention is shown. The optimization step includes: using the open region within a distance to the edge of the barrier region 212 as a buffer region 214. The buffer region 214 is regarded as a barrier region in subsequent steps of generating a navigation path and optimizing the navigation path. Some other optimization steps are described below with reference to FIG. 8 to FIG. 10.

Figures 4, 5:
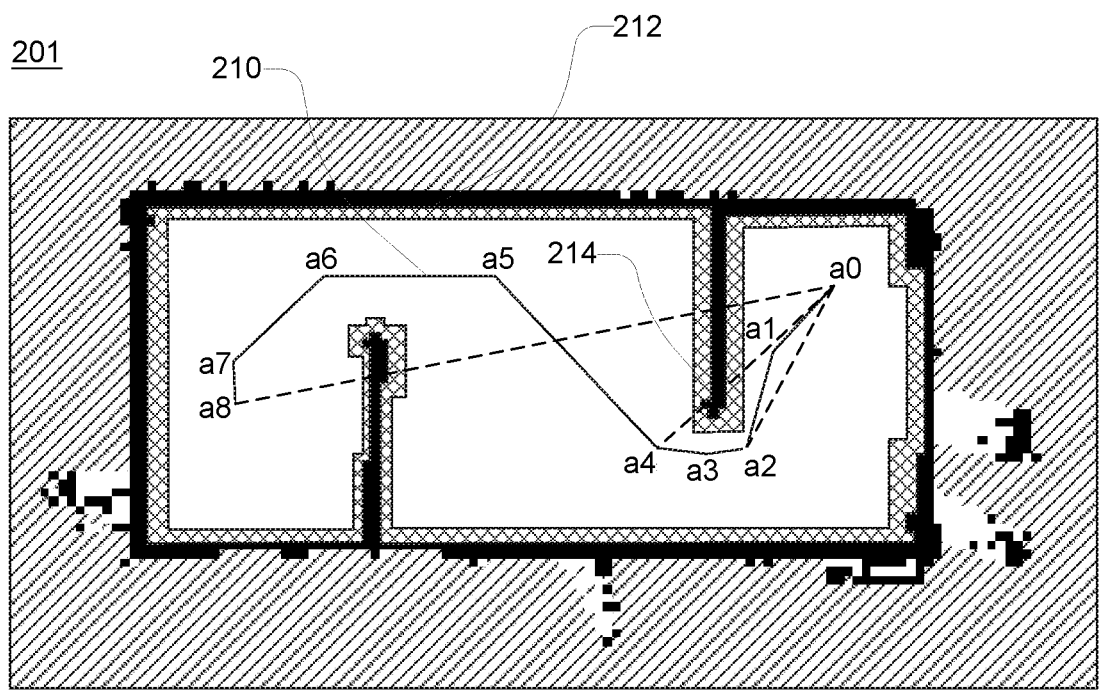
FIG. 4 is a schematic diagram of the Dijkstra's algorithm according to an embodiment of the invention.
FIG. 5 is a schematic diagram of a first navigation path according to an embodiment of the invention.

In step S120: a first navigation path 210 is generated on the environment map 201 according to the target position. Optionally, the first navigation path 210 can be generated using the Dijkstra's algorithm. Details of the Dijkstra's algorithm can be obtained with reference to FIG. 4. Referring to FIG. 4, a schematic diagram of the Dijkstra's algorithm according to an embodiment of the invention is shown. Set pixel point be the unit used in the environment map 201. Starting from the target position 222, weights are assigned to the eight pixel points surrounding the target position 222. The four pixel points respectively located on the top, the bottom, the left and the right of the target position 222 have the same weight, for example, a weight of 10, and the four pixel points located on the two diagonal lines of the target position 222 have the same weight, for example, a weight of 14. The weight of the four pixel points on the two diagonal lines is greater than the weight of the four pixel points located on the top, the bottom, the left and the right of the target position: 222. Set the pixel point whose surrounding pixel points have been weighted be used as a reference node. Then, the eight pixel points surrounding the reference node are weighted, for example, the weighting method is similar to that of the eight pixel points surrounding the target position 222, until the starting node 221 of the AGV is weighted. Starting from the starting node 221 of the AGV, the pixel point whose weight has a largest difference with that of the starting node 221 is selected as the current pixel point, for example, the pixel point in FIG. 4 having a weight of 28 and being adjacent to the starting node 221 is selected. Then, starting from the current pixel point, another pixel point whose weight has a largest difference with that of the current pixel point is selected and used as the next pixel point, and the selection procedure is repeated until the target position 222 is selected. The connection line connecting the starting node 221 and the target position 222 of FIG. 4 is used as the first navigation path 210.

Referring to FIG. 5, a schematic diagram of a first navigation path according to an embodiment of the invention is shown. The first navigation path 210 of the environment map 201 generated by using the Dijkstra's algorithm can be obtained with reference to FIG. 5. The first navigation path 210 includes a plurality of first navigation nodes $a_0 \sim a_{n-1}$. The first navigation nodes $a_0 \sim a_{n-1}$ form a first navigation node set S1=$\{a_0, a_1, a_2 a_{n-1}\}$, wherein n is an integer greater than or equal to 1. When n=9, it means the first navigation path 210 includes 9 first navigation nodes $a_0 \sim a_8$, which form the first navigation node set S1=$\{a_0, a_1, a_2 \ldots a_8\}$.

In step S130: the first navigation path 210 is optimized by using a dichotomy method to generate a second navigation path 220. Specifically, in step S130, two first navigation nodes are selected using a dichotomy method, and whether the connection line connecting the two first navigation nodes passes through the barrier region, such as the barrier region 212 and the buffer region 214, is determined, and a plurality of second navigation nodes and a plurality of second navigation nodes are selected from a plurality of first navigation nodes to form the second navigation path, wherein the quantity of second navigation nodes is smaller than or equal to the quantity of first navigation nodes.

In a specific embodiment, step S130 can be implemented using following algorithm: (1) Set k1=0, k2=n−1. (2) Set A=$a_{k1}$, B=$a_{k2}$, wherein nodes A and B are two nodes selected from the first navigation node set, and k1 and k2 respectively indicate the two first navigation nodes in the first navigation node set that correspond to the nodes A and B. (3) Determine whether the line segment formed by the nodes A and B passes through the barrier region, such as the barrier region 212 and the buffer region 214. If the line segment formed by the nodes A and B passes through the barrier region, such as the barrier region 212 and the buffer region 214, set k2=(k1+k2)/2 and round k2, and the method returns to step (2). If the line segment formed by the nodes A and does not pass through the barrier region, such as the barrier region 212 and the buffer region 214, and k2≠n−1, the node A is used as a second navigation node and is added to the second navigation node set S2, set k1=k2, k2=n−1, and the method returns to step (2). If the line segment formed by the nodes A and B does not pass through the barrier region, such as the barrier region 212 and the buffer region 214, and k2=n−1, the nodes A and B are used as second navigation nodes and are added to the second navigation node set S2. (4) Obtain the second navigation node set S2, wherein a plurality of second navigation nodes in the second navigation node set S2 form the second navigation path.

The algorithm is described below using FIG. 5 as an example: Set k1=0, k2=8. Set A=$a_0$, B=$a_8$. Whether the line segment formed by the node A ($a_0$) and the node B ($a_8$) passes through the barrier region, such as the barrier region 212 and the buffer region 214, is determined. Set k2=(k1+k2)/2=4. Whether the line segment formed by the node A ($a_0$) and the node B ($a_4$) passes through the barrier region, such as the barrier region 212 and the buffer region 214, continues to be determined. Set k2=(k1+k2)/2=2. If the line segment formed by the node A ($a_0$) and the node B ($a_2$) does not pass through the barrier region, such as the barrier region 212 and the buffer region 214, and k2≠8, the node A ($a_0$) is used as a second navigation node and is added to the second navigation node set S2, and set k1=k2=2, k2=8. Based on the subscript, whether the connection line connecting the nodes A and B passes through the barrier region, such as the barrier region 212 and the buffer region 214, is determined according to the above method to select new second navigation nodes. For example, in the present embodiment, the first navigation nodes $a_0, a_2, a_4, a_5, a_6, a_8$ are selected according to the algorithm and are used as the second navigation nodes to form the second navigation node set, and the second navigation path is formed. It can be seen that through step S130, the quantity of navigation paths and the quantity of navigation nodes can be effectively reduced.

Figure 6:
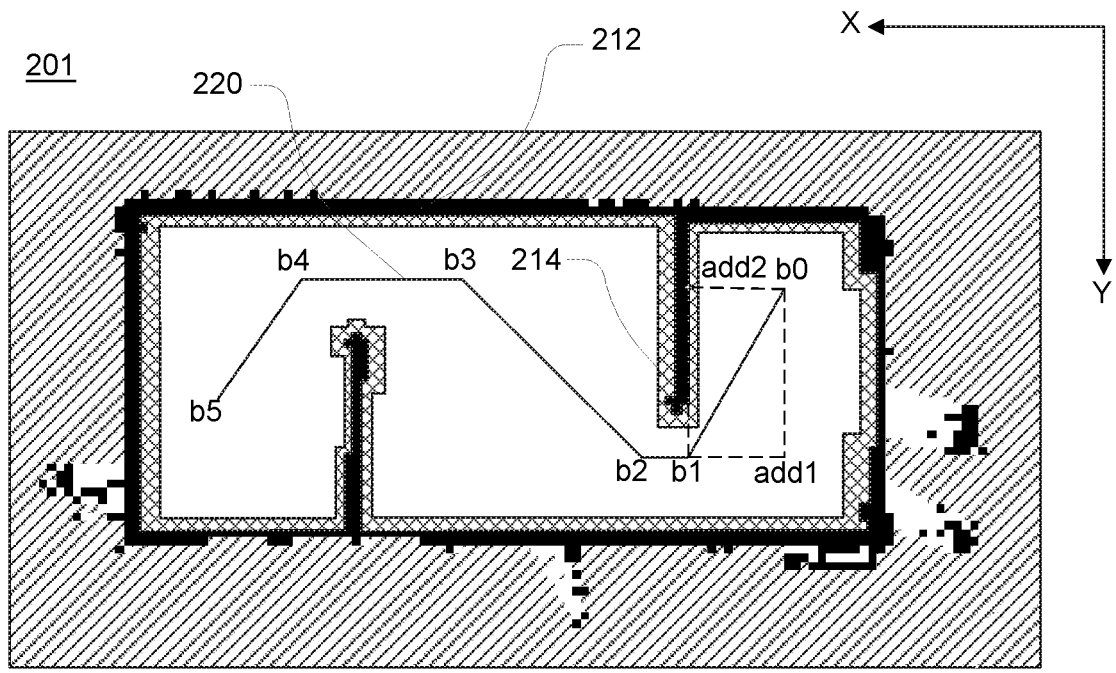
FIG. 6 is a schematic diagram of a second navigation path according to an embodiment of the invention.

Referring to FIG. 6, a schematic diagram of a second navigation path according to an embodiment of the invention is shown. Specifically, a plurality of second navigation nodes $b_0\_b_{m-1}$ are selected from a plurality of first navigation nodes to form the second navigation node set S2=$\{b_0, b_1, b_2 \ldots b_{m-1}\}$, wherein m is an integer greater than or equal to 1. A plurality of second navigation nodes $b_0 \sim b_{m-1}$ form the second navigation path 220, as indicated in FIG. 6. In the present embodiment, m=6, the second navigation path 220 includes 6 second navigation nodes $b_0 \sim b_5$.

Figure 7:
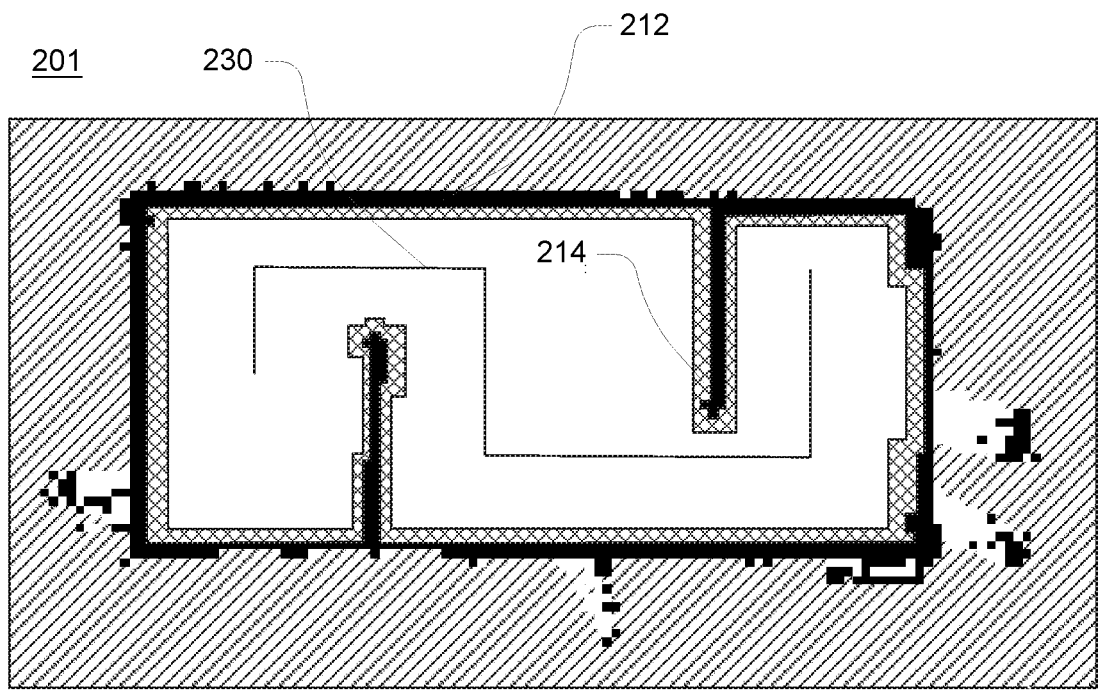
FIG. 7 is a schematic diagram of a third navigation path according to an embodiment of the invention.

In step S140: The second navigation path 220 is orthogonalized to generate a third navigation path 230. Referring to FIG. 7, a schematic diagram of a third navigation path according to an embodiment of the invention is shown. As indicated in FIG. 7, every two adjacent line segments in the third navigation path 230 are orthogonal to each other. Specifically, in step S140, an additional node is formed with respect to every two adjacent second navigation nodes, wherein the connection lines connecting the additional node and the two adjacent second navigation nodes are parallel to the X direction, that is, the first direction, or the Y direction, that is, the second direction, and the X direction is perpendicular to the Y direction; and the additional node and at least some of the second navigation nodes are used as third navigation nodes, wherein a plurality of third navigation nodes form the third navigation path 230.

In a specific embodiment, each of the second and third navigation nodes has a horizontal coordinate along the X direction, that is, the first coordinate, and a vertical coordinate along the Y direction, that is, the second coordinate, and step S140 can be implemented using following algorithm: (1') Set j1=0, j2=1, designation variable p=0, and the quantity of second navigation nodes in the second navigation node set S2 be denoted by q. (2') Set $C=b_{j1}$, $D=b_{j2}$, wherein nodes C and D are two nodes selected from the second navigation node set, and j1 and j2 respectively indicate the two second navigation nodes in the second navigation node set that correspond to the nodes C and D. (3') Set the first coordinate of the additional node be the first coordinate of the node C, and the second coordinate of the additional node be the second coordinate of the node D. (4') Respectively determine whether the line segments formed by the nodes C and D and the additional node pass through the barrier region.

If the line segments formed by the nodes C and D and the additional node both do not pass through the barrier region, and j2≠m−1, the node C and the additional node are used as third navigation nodes and are added to the third navigation node set S3, set j1=j1+1, j2=j2+1, and the method returns to step (2'). If j2=m−1, the nodes C and D and the additional node add are used as third navigation nodes and are added to the third navigation node set S3; If at least one of the line segment formed by the nodes C and D and the additional node passes through the barrier region, set p=p+1.

When p=1, set the first coordinate add.x of the additional node add is the first coordinate D.x of the node D, the second coordinate add.y of the additional node add is the second coordinate C.y of the node C, and the method returns to step (4'). When p=2, set $b_q=b_{q-1}$, $b_{q-1}=b_{q-2}$ ... $b_{j2+1}=b_{j2}$, $b_{j2}.x=(C.x+D.x)/2$, $b_{j2}.y=(C.y+D.y)/2$, q=q+1, p=0, and the method returns to step (3'). (5') Obtain the third navigation node set S3, wherein the third navigation nodes in S3 form the third navigation path.

The algorithm is described below using FIG. 6 as an example: Set j1=0, j2=1, designation variable p=0, the quantity of second navigation nodes in S2 be denoted by q. Set $C=b_0$, $D=b_1$, the X coordinate add.x of the additional node add be the X coordinate add.x of the node C, and the Y coordinate add.y of the additional node add be the Y coordinate D.y of the node D. Thus, the additional node add1 is obtained. If the line segment formed by the node C and the additional node add1 and the line segment formed by the node D and the additional node add1 both do not pass through the barrier region, such as the barrier region 212 and the buffer region 214, and j2≠5, the node C and the additional node add1 are used as third navigation nodes and are added to the third navigation node set S3. set j1=j1+1=1, j2=j2+1=2, and the method returns to step (2'), and a plurality of second navigation nodes and the additional node subsequently obtained are used as third navigation nodes and are added to the third navigation node set S3.

In some variations of the embodiments of the invention, set j1=0, j2=1, designation variable p=0, the quantity of second navigation nodes in the second navigation node set S2 be denoted by q (q=7 in the present embodiment), $C=b_0$, $D=b_1$, the X coordinate add.x of the additional node add be the X coordinate D.x of the node D, and the Y coordinate add.y of the additional node add be the Y coordinate C.y of the node C. Thus, the additional node add2 is obtained. If at least one of the line segments formed by the nodes C and D and the additional node add2 passes through the barrier region, such as the barrier region 212 and the buffer region 214, set designation variable p=p+1, meanwhile p=1, set the first coordinate add.x of the additional node add be the first coordinate C.x of the node C, and the second coordinate add.y of the additional node add be the second coordinate D.y of the node D to obtain the additional node add1, and the method returns to step (4'), whether the line segment formed by the add1 and the nodes C and D passes through the barrier region 212 and the buffer region 214 is determined. If at least one of the line segments formed by the nodes C and D and the additional node add1 passes through the barrier region, such as the barrier region 212 and the buffer region 214, set designation variable p=p+1, meanwhile, p=2, and the quantity of second navigation nodes in S2 set as q=q+1. That is, set the quantity of second navigation nodes in S2 be 8, and the coordinate of $b_4$ is assigned to $b_5$, the coordinate of $b_3$ is assigned to $b_4$, until the coordinate of $b_1$ is assigned to $b_2$ by the same analogy. Then, set the coordinate of $b_1$ be the middle point between $b_0$ (the node C) and $b_1$ (the node D). That is, the middle point between $b_0$ and $b_1$ is also used as a second navigation node and is added to the second navigation node set, and set p=0, and whether the connection line connecting the middle point and $b_0$ and the connection line connecting the additional node add and the middle point and $b_0$ pass through the barrier region is determined by using the above steps.

Thus, a plurality of third navigation nodes can be obtained using the algorithm to form the third navigation path 230 as indicated in FIG. 7. Every two adjacent line segments in the third navigation path 230 are orthogonal to each other. In step S150: the AGV is navigated to the target position using the third navigation path 230.

Some optimization methods of the environment map provided in the invention are described below with reference to FIG. 8 to FIG. 10.

Specifically, the environment map 301, which can be realized by a dot matrix map, is composed of a plurality of pixel points. The environment map 301 includes an open region 311 composed of a plurality of pixel points displaying white color, that is, the first color, and a barrier region 312 composed of a plurality of pixel points displaying black color, that is, the second color. In some embodiments, for any pixel point of the environment map, the pixel point displays the first color if the pixel point displays black color, and the eight pixel points adjacent to the pixel point, such as four pixel points located on the top, the bottom, the left and the right of the pixel point, and four pixel points located on the two diagonal lines, display white color.

In some embodiments, for any pixel point of the environment map, a pixel point displays the same color with at least five consecutive pixel points of the eight pixel points surrounding the pixel point if the at least five consecutive pixel points display a color different from that displayed by the pixel point. For example, if the pixel point displays white color, and five of the eight pixel points surrounding the pixel point display black color, the pixel point displays black color. The five pixel points refer to the pixel points at the top, the top left, the left, the bottom left and the bottom of the pixel point.

Figure 8:
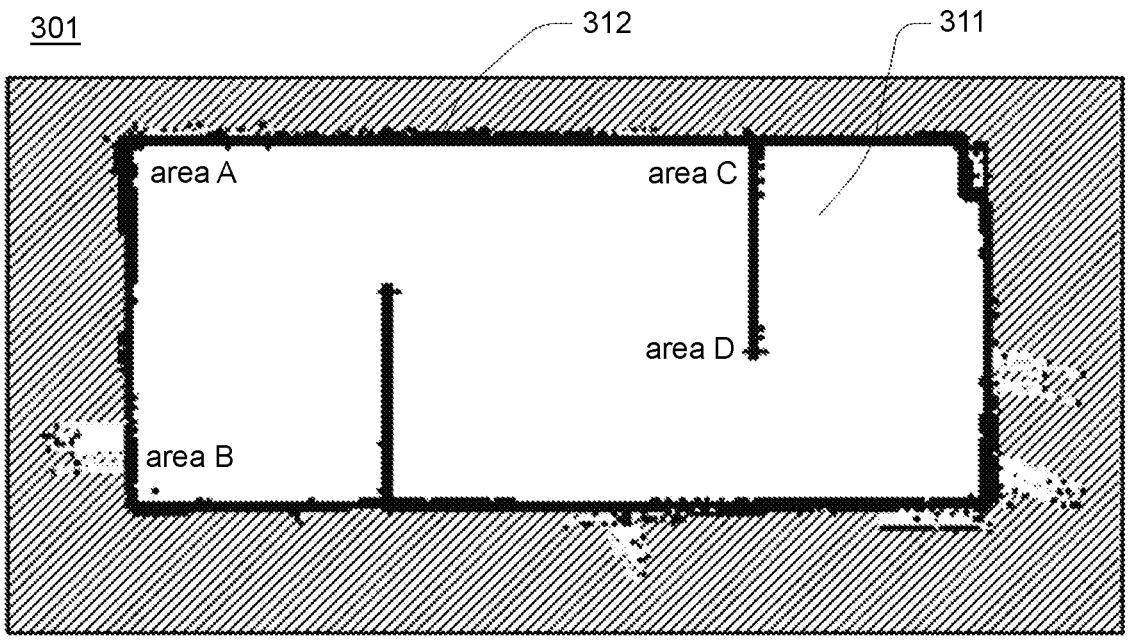
FIG. 8 is a schematic diagram of a pre-optimized environment map according to an embodiment of the invention.

Referring to FIG. 8, a schematic diagram of a pre-optimized environment map according to an embodiment of the invention is shown. As indicated in FIG. 8, for any of the barrier region 312 in the environment map 301, the serrated region is filled up with black color if the barrier region 312 has a serrated edge. Specifically, for any of the barrier region 312, the connection line connecting the two and more than two pixel points is filled up with black color if the edge of the barrier region 312 has two and more than two pixel points displaying white color.

In some embodiments, a barrier region 312 of the environment map 301 has a corner area. If the corner area of the barrier region 312 has two and more than two pixel points displaying white color, and the edge of the barrier region 312 has two and more than two pixel points displaying white color and located in the same column or the same row with the two and more than two pixel points displaying white color, the connection line connecting the pixel points displaying white color is filled with black color. As indicated in FIG. 8, the corner area C of the barrier region 312 has two and more than two pixel points displaying white color; that is, the pixel points displaying white color and located to the right of the area C of the barrier region 312, and the edge of the barrier region 312 has two and more than two pixel points displaying white color and located in the same column or the same row of the array of pixel points with two and more than two pixel points displaying white color and located at the area C. As shown in the area D, the pixel points displaying white color located to the right of the area D of the barrier region 312, such that the connection line connecting the two pixel points of the areas C and D, which are most farther away from each other and display white color, is displayed in black color so that all pixel points on the connection line display black color. In the present embodiment, the pixel points, which are located at the areas C and D and display white color, are located in the same row in the array of pixel points.

Figure 10:
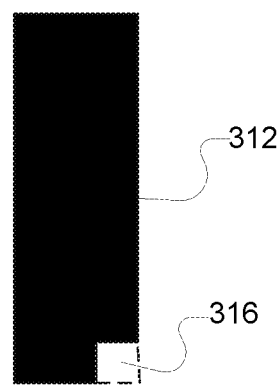
FIG. 10 is a schematic diagram of a barrier region according to an embodiment of the invention.

Referring to FIG. 10, a schematic diagram of a barrier region according to an embodiment of the invention is shown. As indicated in FIG. 10, for any of the barrier region 312 of the environment map, if three of the eight pixel points adjacent to a pixel point 316 displaying while color are now displaying black color on the edge of the barrier region 312, the pixel point 316 originally displaying white color changes to display black color.

Figure 9:
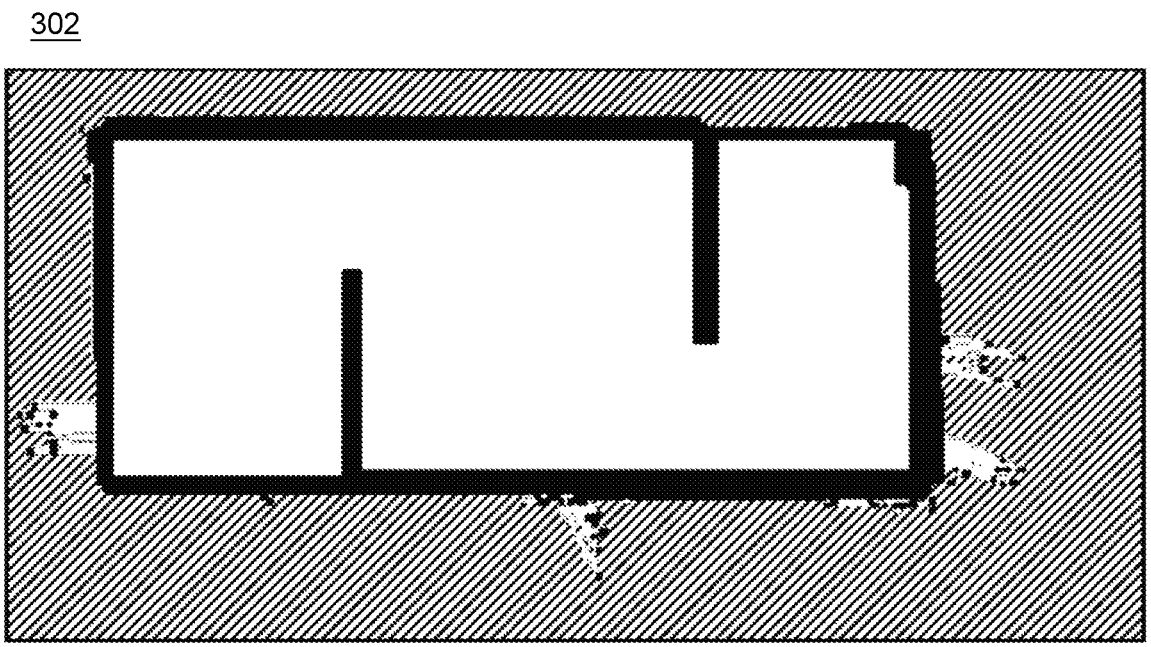
FIG. 9 is a schematic diagram of an optimized environment map according to an embodiment of the invention.

Referring to FIG. 9, a schematic diagram of an optimized environment map according to an embodiment of the invention is shown. By performing optimization to the environment map using one of many of the above optimization methods, the noises contained in the environment map are reduced, and the edges of the barrier region are modified. The optimized environment map 302 can be obtained with reference to FIG. 9. The invention generate a navigation path according to the optimized environment map 302, and the influence on the navigation path caused by the noises and the serration on the edges of the barrier region is reduced.

In comparison to the prior art, the invention has following advantages:

1) By performing optimization to the navigation path twice, every two adjacent line segments in the third navigation path are orthogonal to each other, and the quantity of turns in the navigation path of the automated guided vehicle is reduced;

2) By optimizing the first navigation path with the dichotomy method and orthogonalizing the second navigation path, the quantity of nodes in the navigation path is reduced;

3) By performing optimization to the environment map, the noises contained in the environment map are reduced, the edges of the barrier region are modified, and the influence on the planning of navigation path caused by the noises is reduced.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for navigating an automated guided vehicle, comprising:

generating an environment map for the automated guided vehicle and setting a target position, wherein the environment map at least comprises an open region and a barrier region;

generating a first navigation path on the environment map according to the target position;

optimizing the first navigation path by using a dichotomy method to generate a second navigation path;

orthogonalizing the second navigation path to generate a third navigation path, wherein every two adjacent line segments in the third navigation path are orthogonal to each other; and navigating the automated guided vehicle to the target position by using the third navigation path, wherein the second navigation path comprises a plurality of second navigation nodes, and the step of orthogonalizing the second navigation path to generate a third navigation path comprises:

forming an additional node with respect to every two adjacent second navigation nodes, wherein connection lines connecting the additional node and the two adjacent second navigation nodes are parallel to the first direction or the second direction, and the first direction is perpendicular to the second direction; and using the additional node and the two adjacent second navigation nodes as third navigation nodes, wherein a plurality of the third navigation nodes form the third navigation path.

2. The method according to claim 1, wherein the first navigation path comprises a plurality of first navigation nodes, and the step of optimizing the first navigation path by using the dichotomy method to generate second navigation path comprises:

selecting two first navigation nodes by using the dichotomy method, and determining whether a connection line connecting the two first navigation nodes passes through the barrier region, and further selecting a plurality of second navigation nodes from a plurality of the first navigation nodes to form the second navigation path, wherein a quantity of the second navigation nodes is smaller than or equal to a quantity of the first navigation nodes.

3. The method according to claim 2, wherein a plurality of first navigation nodes $a_0$-$a_{n-1}$ form a first navigation node set $S1=\{a_0, a_1, a_2 \ldots a_{n-1}\}$, wherein n is an integer greater than or equal to 1, and the step of optimizing the first navigation path by using the dichotomy method to generate the second navigation path comprises:

i. setting $k1=0$, $k2=n-1$;

ii. setting $A=a_{k1}$, $B=a_{k2}$, wherein nodes A and B are two nodes selected from the first navigation node set, and k1 and k2 respectively indicate the two first navigation nodes in the first navigation node set that correspond to the nodes A and B;

iii. determining whether the line segment formed by the nodes A and B passes through the barrier region;
if the line segment formed by the nodes A and B passes through the barrier region, setting k2=(k1+k2)/2 and rounding k2, and returning to step ii;
if the line segment formed by the nodes A and B does not pass through the barrier region, and k2≠n−1, taking the node A as a second navigation node and adding the node A to a second navigation node set S2, setting k1=k2, k2=n−1, and returning to step ii; and
if the line segment formed by the nodes A and B does not pass through the barrier region, and k2=n−1, taking the nodes A and B as second navigation nodes and adding the nodes A and B to the second navigation node set S2; and
iv. obtaining the second navigation node set S2, wherein a plurality of the second navigation nodes in the second navigation node set S2 form the second navigation path.

4. The method according to claim 1, wherein a plurality of the second navigation nodes $b_0 \sim b_{m-1}$ form the second navigation node set S2={$b_0, b_1, b_2 \ldots b_{m-1}$}, wherein m is an integer greater than or equal to 1, each of the second and third navigation nodes has a first coordinate along the first direction and a second coordinate along the second direction, wherein the step of orthogonalizing the second navigation path to generate the third navigation path comprises:
i'. setting j1=0, j2=1, wherein a variable p=0 is designated, and quantity of the second navigation nodes in the second navigation node set S2 is denoted by q;
ii'. setting C=$b_{j1}$, D=$b_{j2}$, wherein nodes C and D are two nodes selected from the second navigation node set, and j1 and j2 respectively indicate the two second navigation nodes in the second navigation node set that correspond to the nodes C and D;
iii'. setting a first coordinate of the additional node be a first coordinate of the node C, and a second coordinate of the additional node add be a second coordinate of the node D;
iv'. respectively determining whether the line segments formed by the nodes C and D and the additional node pass through the barrier region;
if the line segments formed by the nodes C and D and the additional node both do not pass through the barrier region, and j2≠m−1, taking the node C and the additional node as the third navigation nodes for being added to a third navigation node set S3, setting j1=j1+1, j2≤j2+1, and the method returning to step ii';
if j2=m−1, taking the nodes C and D and the additional node as the third navigation nodes for being added to the third navigation node set S3;
if at least one of the line segments formed by the nodes C and D and the additional node passes through the barrier region, setting p=p+1,
when p=1, setting the first coordinate of the additional node being a first coordinate of the node D, and the second coordinate of the additional node being a second coordinate of the node C, and returning to step iv'; and
when p=2, setting $b_q=b_{q-1}$, $b_{q-1}=b_{q-2}$ ... $b_{j2+1}=b_{j2}$, $b_{j2}.x=(C.x+D.x)/2$, $b_{j2}.y=(C.y+D.y)/2$, q=q+1, p=0, and returning to step iii', wherein $b_{j2}.x$ is a first coordinate of $b_{j2}$; $b_{j2}.y$ is a second coordinate of $b_{j2}$; C.x is the first coordinate of the node C; C.y is the second coordinate of the node C; D.x is the first coordinate of the node D; and D.y is the second coordinate of the node D; and
v'. obtaining the third navigation node set S3, wherein a plurality of the third navigation nodes in the third navigation node set S3 form the third navigation path.

5. The method according to claim 1, wherein the environment map comprises an open region composed of a plurality of pixel points displaying a first color, and the barrier region composed of a plurality of pixel points displaying a second color, wherein the step of generating the environment map for the automated guided vehicle and setting the target position comprises:
optimizing the environment map by changing the color displayed by some of the pixel points according to each pixel point and its surrounding pixel points of the environment map.

6. The method according to claim 5, wherein the step of optimizing the environment map comprises:
for any of the pixel points of the environment map, enabling the any pixel point to display in the first color if the any pixel point originally displays the second color but a plurality of the pixel points adjacent to the pixel point display the first color.

7. The method according to claim 6, wherein the step of optimizing the environment map comprises:
for any of the pixel points of the environment map, enabling the any pixel point to display same color with at least five consecutive pixel points of eight pixel points surrounding the any pixel point if the at least five consecutive pixel points display a color different from that displayed by the any pixel point.

8. The method according to claim 5, wherein the step of optimizing the environment map comprises:
for any of the barrier region of the environment map, filling up a serrated region with the second color if the any of the barrier region has an edge being serrated.

9. The method according to claim 8, wherein the step of optimizing the environment map comprises:
for any of the barrier region of the environment map, if the edge of the barrier region has two and more than two of the pixel points displaying the first color, filling up a connection line connecting the two and more than two pixel points with the second color.

10. The method according to claim 5, wherein the step of optimizing the environment map comprises:
if a corner area of the barrier region of the environment map has two and more than two pixel points displaying the first color, and an edge of the barrier region has two and more than two pixel points displaying the first color and located in the same column or the same row with the two and more than two pixel points displaying the first color in the corner area, filling up a connection line connecting the pixel points originally displaying the first color with the second color.

11. The method according to claim 5, wherein the step of optimizing the environment map comprises:
for any of the barrier region of the environment map, enabling the pixel point originally displaying the first color to change to display the second color if three of eight pixel points adjacent to the pixel point displaying the first color are displaying the second color on an edge of the barrier region.

* * * * *